(12) United States Patent
Benson et al.

(10) Patent No.: US 8,412,569 B1
(45) Date of Patent: Apr. 2, 2013

(54) DETERMINING ADVERTISING STATISTICS FOR ADVERTISERS AND/OR ADVERTISING NETWORKS

(75) Inventors: Scott Benson, Sunnyvale, CA (US); Gokul Rajaram, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/021,349

(22) Filed: Feb. 4, 2011

Related U.S. Application Data

(63) Continuation of application No. 11/394,194, filed on Mar. 31, 2006, now abandoned.

(51) Int. Cl.
*G06Q 30/00* (2012.01)
(52) U.S. Cl. ..................................... 705/14.1
(58) Field of Classification Search .................. 705/14.1
See application file for complete search history.

(56) References Cited

U.S. PATENT DOCUMENTS

| | | |
|---|---|---|
| 2003/0171990 A1 | 9/2003 | Rao et al. |
| 2004/0172389 A1 | 9/2004 | Galai et al. |
| 2005/0235030 A1* | 10/2005 | Lauckhart et al. ............ 709/200 |

OTHER PUBLICATIONS

International Search Report and Written Opinion dated Nov. 23, 2007, 11 total pages.

* cited by examiner

*Primary Examiner* — Daniel Lastra
(74) *Attorney, Agent, or Firm* — Harrity & Harrity, LLP

(57) ABSTRACT

A system determines a number of times that clients access a group of documents associated with a web site or a group of web sites. At least one document in the group of documents includes at least one advertisement. The system further determines a percentage of client views for an advertiser or an advertising network across the web site or group of web sites based on the determined number of times.

44 Claims, 9 Drawing Sheets

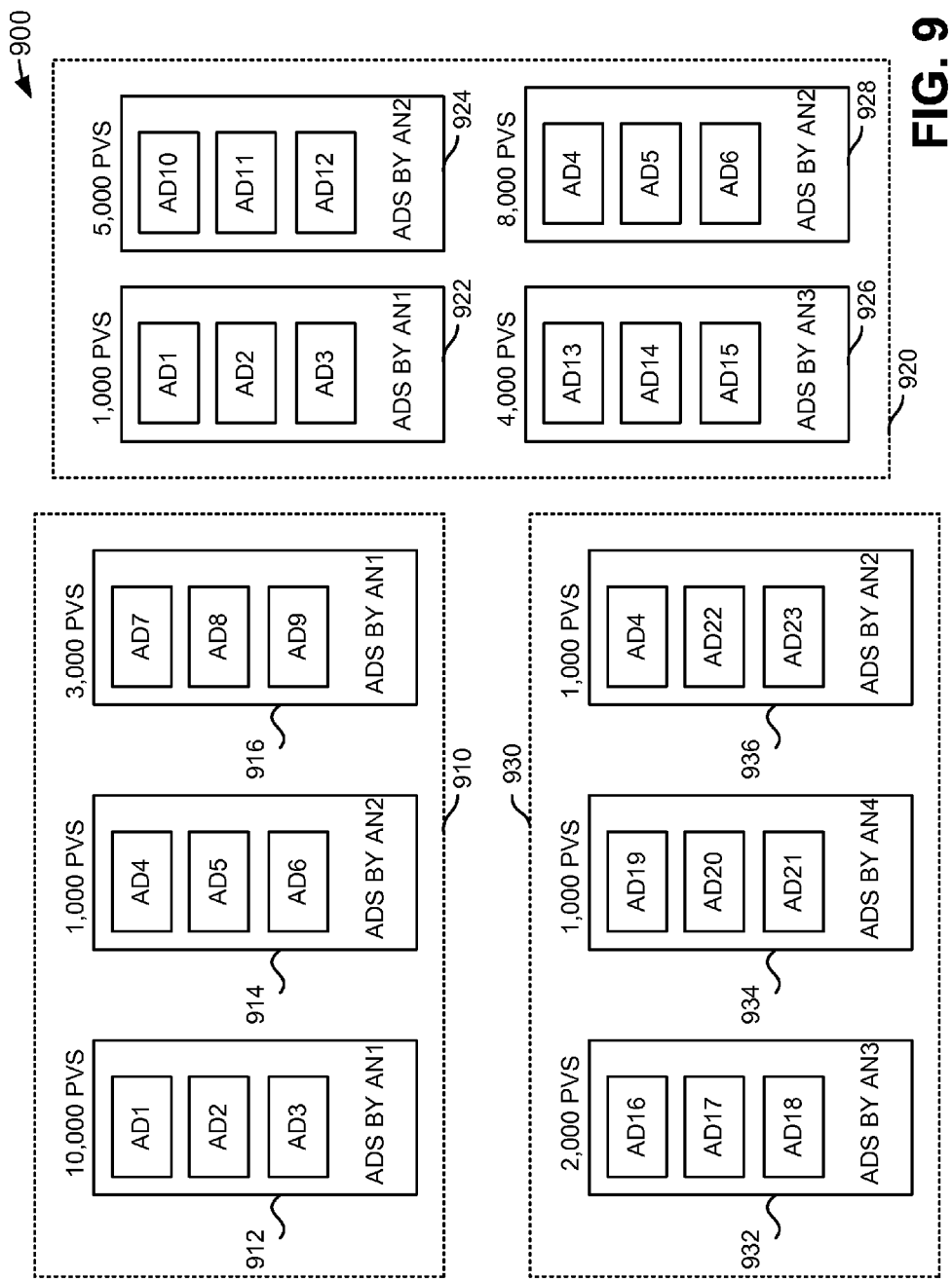

DETERMINING ADVERTISING STATISTICS FOR ADVERTISERS AND/OR ADVERTISING NETWORKS

RELATED APPLICATION

This application is a continuation of U.S. patent application Ser. No. 11/394,194, filed Mar. 31, 2006, which is incorporated herein by reference.

FIELD OF THE INVENTION

Implementations consistent with the principles of the invention relate generally to communication networks and, more particularly, to determining advertising statistics for an advertiser and/or advertising network across one or more documents or web sites.

BACKGROUND OF THE INVENTION

Users browsing the Internet will often encounter advertisements on the web pages that they access. Internet advertising has become big business with companies scrambling to find ways to make their advertisements appear most prominently on web pages, particularly the web pages that users most often access.

One way for companies to get an edge over their competitors is to find out what web sites are the most popular and to determine how the visibility of their advertisements on these web sites compare to those of their competitors. Some companies may employ individuals to look at advertisements appearing on a random set of web pages for a web site and then perform some manual calculation to determine the company's visibility on that web site. This technique is not only time consuming, but is often very inaccurate since the random set of web pages may include web pages that users rarely access.

SUMMARY OF THE INVENTION

In accordance with one implementation consistent with principles of the invention, a method may include determining a number of times that clients access a group of documents associated with a web site, where at least one document in the group of documents includes at least one advertisement. The method may further include determining a percentage of client views for an advertiser or an advertising network across the web site based on the determined number of times.

In another implementation consistent with principles of the invention, a method may include determining, for each document in a group of documents associated with a group of web sites, a number of times that clients access the document, where at least one document in the group of documents includes at least one advertisement. The method may further include determining a percentage of client views for an advertiser or an advertising network across the group of web sites based on the determined numbers of times.

In yet another implementation consistent with principles of the invention, a method may include capturing document identification information in response to clients accessing a group of documents containing advertisements; determining values representing a number of times that each document in the group of documents is accessed based on the captured document information; and determining share-of-site or share-of-market statistics for at least one of an advertiser or an advertising network based on the determined values.

BRIEF DESCRIPTION OF THE DRAWINGS

The accompanying drawings, which are incorporated in and constitute a part of this specification, illustrate one or more implementations of the invention and, together with the description, explain the invention. In the drawings.

FIGS. 7-9 provide illustrative examples of the exemplary process of FIG. 6.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

Overview

Systems and methods consistent with principles of the invention provide information to advertisers or advertising networks relating to the visibility of advertisements on one or a group of documents and/or web sites. In this way, advertisers and advertising networks can determine not only the visibility of their own advertisements, but also the visibility of their competitors. With this information, advertisers and advertising networks may take actions to increase their presence on popular web sites in which their competitors have a marketing advantage, leading to increased visibility and profits.

Figure 1:
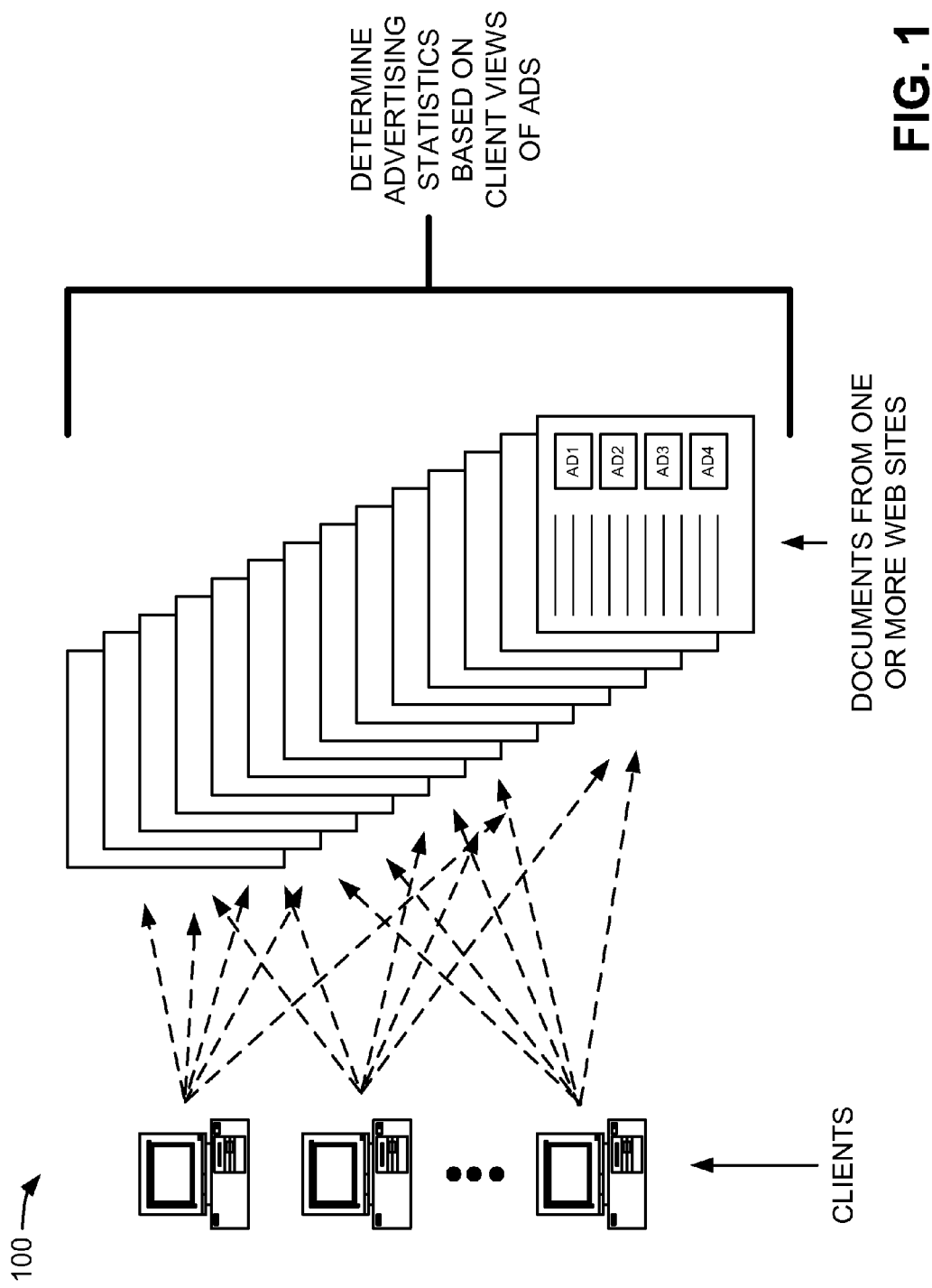
FIG. 1 is a diagram illustrating an exemplary concept consistent with the principles of the invention.

FIG. 1 is a diagram illustrating an exemplary concept consistent with the principles of the invention. As illustrated, a group of clients may access documents from one or more web sites in a well-known manner. The documents may contain advertisements from different advertisers and even from different advertising networks. As the clients access the documents from the web site(s), logs may be created that capture the identity of the documents the clients are accessing and track the number of clients visiting each document (also called the number of pageviews or client views for each document). The logs may be used to determine the popularity of each document. For example, a document that is accessed 10,000 times over a given time period may be considered to be more popular than a document that is accessed 1,000 times over that same time period. Advertisers and advertising networks are interested in having their advertisements displayed on more popular documents than less popular documents.

Based on the logs, statistics may be generated for a specific advertiser or advertising network. For example, the logs may be used to determine the advertiser's or advertising network's "share-of-document" for a specific document, which may be defined as the visibility (or presence) of the advertiser's ad or advertising network's ad(s) compared to all of the other ads on the document. The logs may also be used to determine the advertiser's or advertising network's "share-of-site" for a web site, which may be defined as the percentage of client views of the advertiser's ad or advertising network's ad(s) (i.e., the percentage of times that clients accessed a document that included the ad(s)) across the web site. The logs may be further used to determine the advertiser's or advertising network's "share-of-market" for a group of web sites (e.g., all or a portion of the web sites in a particular country, all or a portion of the web sites on the Internet, or some other grouping of web sites), which may be defined as the percentage of individual client views of the advertiser's ad or advertising network's ad(s) across the group of web sites. By monitoring share-of-document, share-of-site, and/or share-of-market information for a group of advertisers and/or advertising networks over time, new advertising competitors may be readily identified, decreases/increases in share-of-site for each advertiser or advertising network may be determined, etc. This information may provide advertisers and/or advertising networks with a marketing advantage over competitors that do not have this type of information.

A "document," as the term is used herein, is to be broadly interpreted to include any machine-readable and machine-storable work product. A document may include, for example, an e-mail, a file, a combination of files, one or more files with embedded links to other files, a news group posting, a blog document, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document. A "web site," as the phrase is used herein, is to broadly interpreted to include a logical grouping of documents (e.g., web pages).

Exemplary Network Configuration

Figure 2:
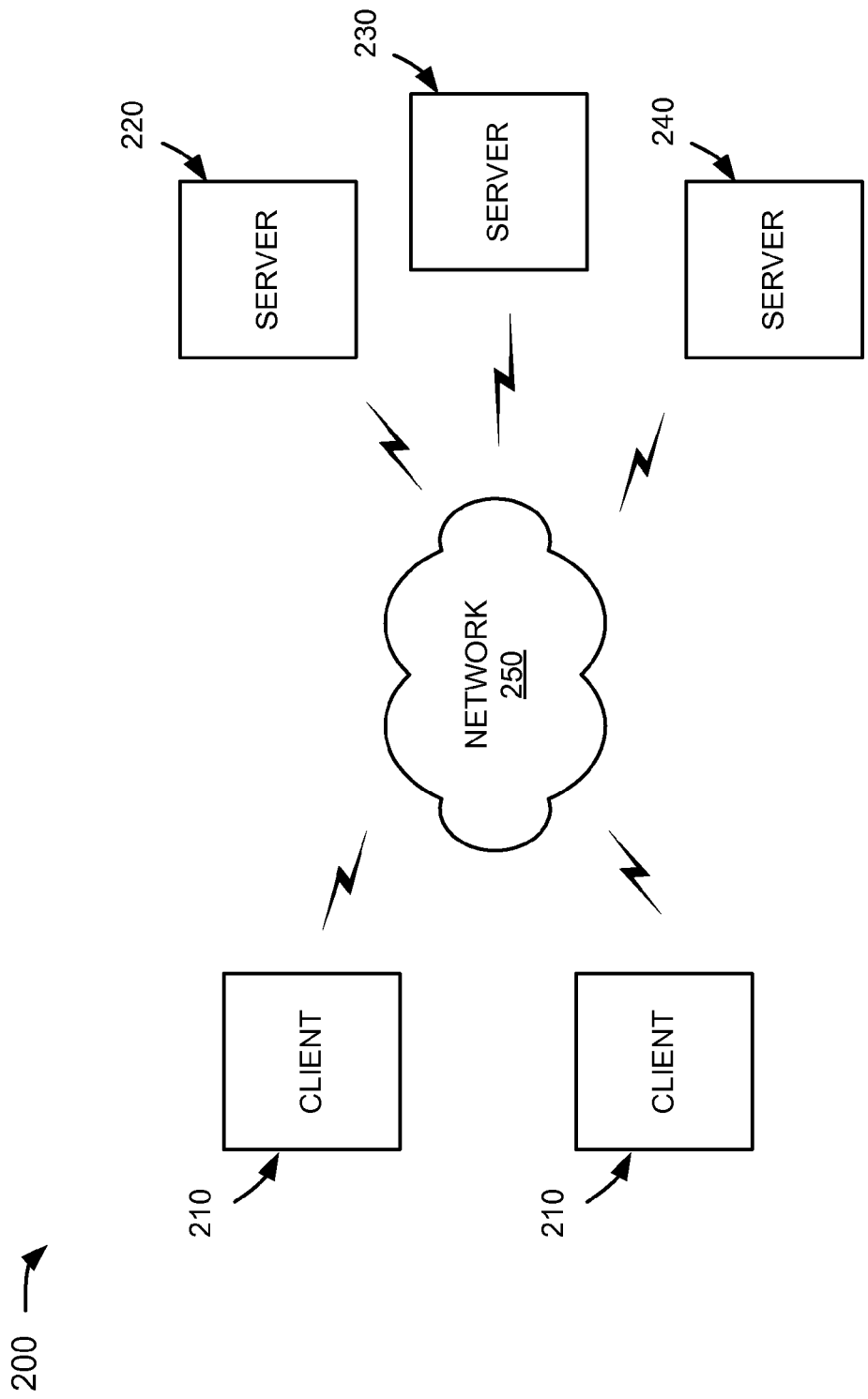
FIG. 2 is a diagram of an exemplary network in which systems and methods consistent with the principles of the invention may be implemented.

FIG. 2 is a diagram of an exemplary network 200 in which systems and methods consistent with principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention. In one implementation consistent with the principles of the invention, servers 220-240 may maintain documents that include advertisements.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, another type of network, or a combination of networks. Clients 210 and servers 220-240 may connect to network 250 via wired, wireless, and/or optical connections.

Exemplary Client/Server Architecture

Figure 3:
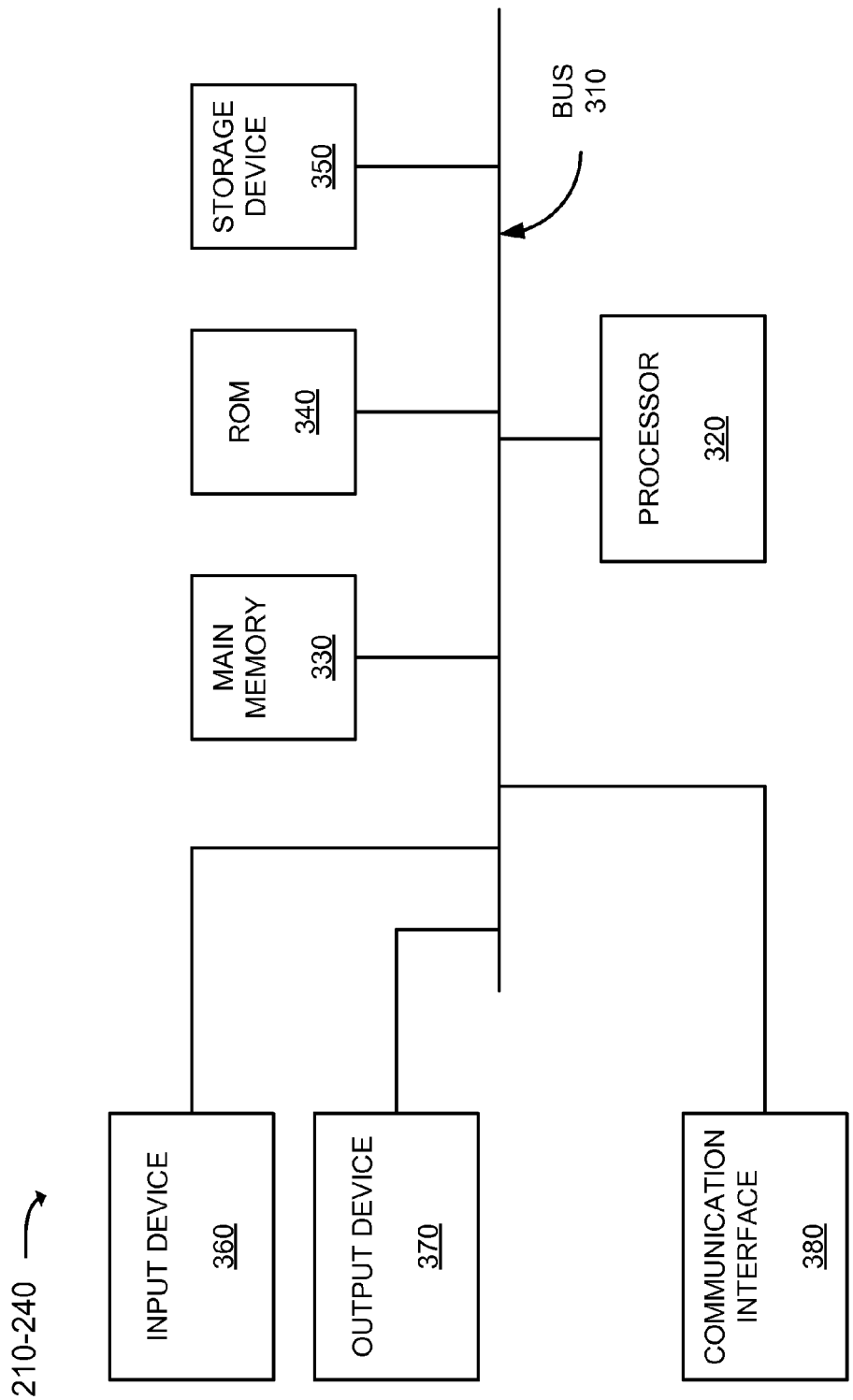
FIG. 3 is a diagram of an exemplary client or server entity in an implementation consistent with the principles of the invention.

FIG. 3 is an exemplary diagram of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a processor, microprocessor, or processing logic that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive.

Input device 360 may include a mechanism that permits an operator to input information to the client/server entity, such as a keyboard, a mouse, a pen, voice recognition and/or biometric mechanisms, etc. Output device 370 may include a mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Computer-Readable Medium

Figure 4:
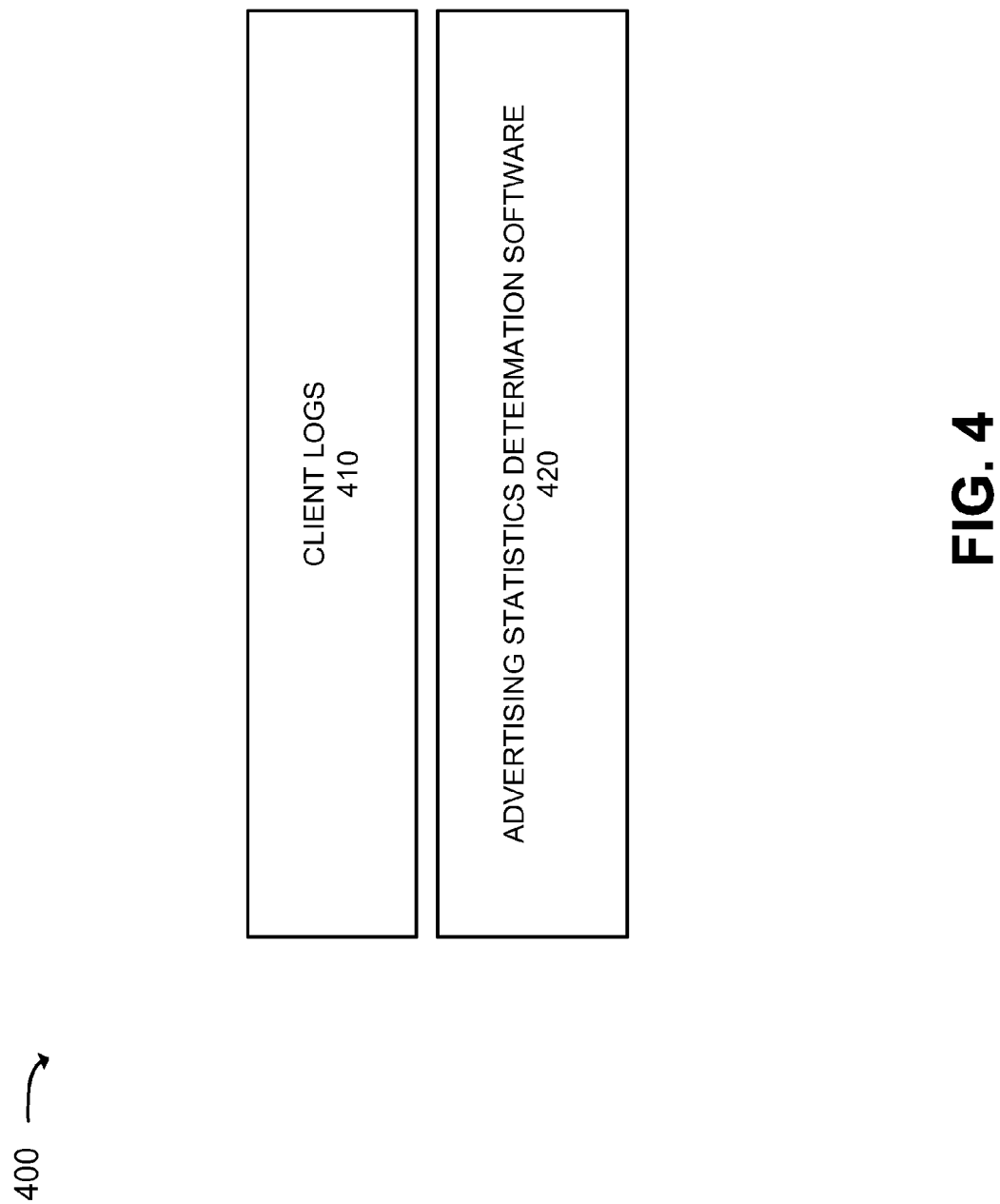
FIG. 4 is a diagram of a portion of an exemplary computer-readable medium that may be used by the server of FIG. 2.

FIG. 4 is a diagram of a portion of an exemplary computer-readable medium 400 that may be used by a server, such as server 220. In one implementation, computer-readable medium 400 may correspond to memory 330 of server 220. In other implementations, computer-readable medium 400 may correspond to a number of memories in one or a number of different servers. The portion of computer-readable medium 400 illustrated in FIG. 4 may include client logs 410 and advertising statistics determination software 420.

Client logs 410 may include information relating to client visits to documents for a web site of a group of web sites over a period of time. The information may include, for example, the identities of the documents that the clients accessed and a pageview count for each document. Advertising statistics determination software 420 may include software for determining share-of document, share-of-site, and/or share-of-market statistics for one or more advertisers and/or one or more advertising networks across a document and/or one or more web sites. Advertising statistics determination software 420 may provide one or more reports based on the share-of-document, share-of-site, and/or share-of-market determinations.

Obtaining Client Logs

Figure 5:
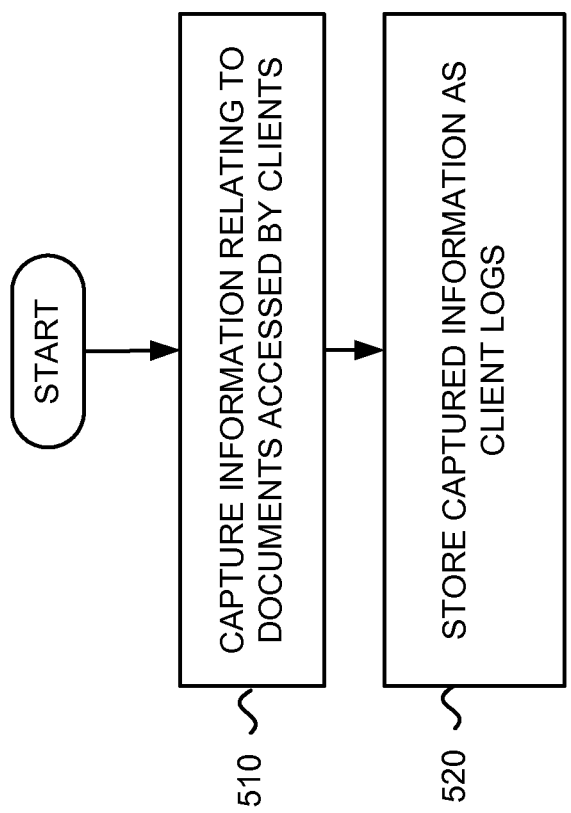
FIG. 5 is a flow chart of an exemplary process for obtaining client logs in an implementation consistent with the principles of the invention.

FIG. 5 is a flow chart of an exemplary process for obtaining client logs in an implementation consistent with principles of the invention. The processing described with respect to FIG. 5 may be performed by a server, such as server 220, or a group of servers. Processing may begin by capturing information relating to documents accessed by clients, such as clients 210 (block 510). The information may include the identity of the web sites and documents that clients 210 access.

The document identification information may be captured, for example, as part of advertising logs, browser logs, and/or toolbar logs. Advertising logs may also be used for capturing information identifying documents accessed by clients 210. For example, when a client 210 visits a document that provides AdSense advertisements, code on the document (e.g., javascript, XML code, etc.) may cause a request for advertisements to be sent to an advertising server. The request may include the URL of the document. The URL may be logged, along with information identifying which advertisements were shown on that document.

Browser logs may be used for capturing information identifying documents accessed by clients 210. For example, some browsers, such as the Opera browser, may provide conceptually-targeted advertisements with documents. Thus, the browser may send a request for advertisements to an advertising server for a document accessed by client 210. The request may include the URL of the document. The URL may be logged, along with information identifying which advertisements were shown on that document.

When a client 210 accesses a document using a browser toolbar, such as the Google toolbar, a request for a pagerank for the document that client 210 is accessing may be sent to a server, such as server 220. The pagerank request may include all or a portion of the URL associated with the accessed document. This document identification information may be captured by server 220.

Once document identification information has been captured (e.g., a URL), the content of each document may be analyzed to identify any advertisements that may be associated with the document, if not already known. For example, it will be appreciated that advertisements may be identifiable via some standard signature. As such, advertisements from a document may be identified and the advertiser and/or advertising network with which each advertisement is associated may also be identified. This advertising information may be associated with the document identification information.

The logged information may be stored (block 520), for example, in a computer-readable medium, such as computer-readable medium 400, as client logs 410. Client logs 410 may include information identifying documents that were accessed by clients 210 and advertising information (e.g., advertiser and/or advertising network identities) associated with the documents.

Determining Advertising Statistics

Figure 6:
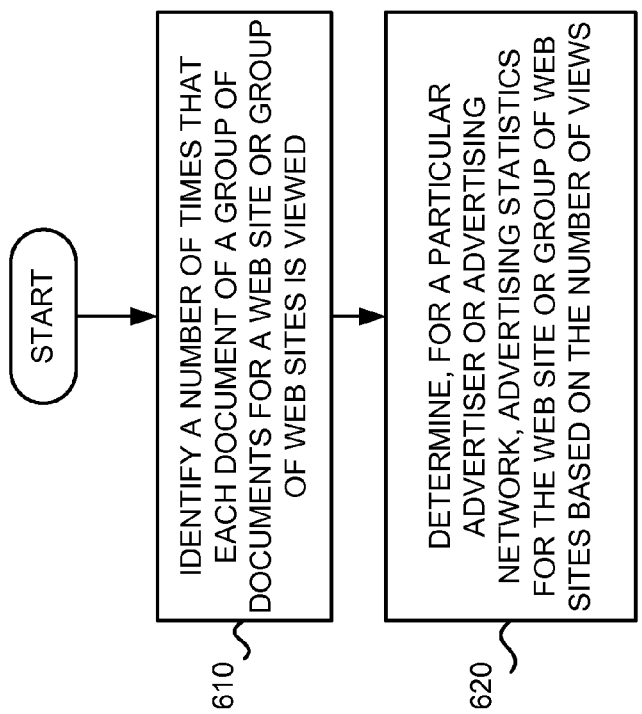
FIG. 6 is a flow chart of an exemplary process for determining advertising statistics for a document or web site in an implementation consistent with the principles of the invention.

FIG. 6 is a flow chart of an exemplary process for determining advertising statistics for a document of one or more web sites in an implementation consistent with the principles of the invention. The processing described with respect to FIG. 6 may be performed by a server, such as server 220, or a group of servers. Processing may begin by identifying a number of times that each document of a group of documents associated with a web site(s) or a group of web sites has been viewed (block 610). To identify the number of times that each document has been viewed, the number of times that the document appears in client logs 410 may be counted. The total number of times that each document appears in client logs 410 may represent an estimated total pageviews (or client views) for the document. Thus, an analysis of client logs 410 may provide an estimated total pageview value for each document associated with a web site or a group of web sites. In alternative implementations, an estimated total pageview value may be determined for a predetermined number of the most popular documents associated with a web site. For example, in one implementation, an estimated total pageview value may be determined for the 50 most popular documents associated with a web site.

Advertising statistics for the web site or group of web sites may be determined for a particular advertiser or advertising network based on the number of client views (block 620). The advertising statistics may include share-of-document, share-of-site, and/or share-of-market for a particular advertiser or advertising network.

The advertiser's or advertising network's information from client logs 410 may be aggregated across a document to determine the share-of-document for the advertiser or advertising network. For example, the share-of-document for a particular advertiser may be determined as:

$$\frac{\text{NUMBER OF ADVERTISER'S ADVERTISEMENTS ON DOCUMENT}}{\text{TOTAL NUMBER OF ADVERTISEMENTS ON DOCUMENT}}.$$

Similarly, the share-of-document for a particular advertising network may be determined as:

$$\frac{\text{NUMBER OF ADVERTISING NETWORK'S ADVERTISEMENTS ON DOCUMENT}}{\text{TOTAL NUMBER OF ADVERTISEMENTS ON DOCUMENT}}.$$

The advertiser's or advertising network's information from client logs 410 may be aggregated across a web site and weighted by the total number of pageviews (PVS) for the documents with which the advertiser's or advertising network's information is associated to determine the share-of-site for the advertiser or advertising network. For example, the share-of-site for a particular advertiser may be determined as:

$$\frac{\text{TOTAL NO. OF PVS FOR DOCS ON SITE WITH WHICH ADVERTISER ASSOCIATED}}{\text{TOTAL NO. OF PVS OF DOCS ON SITE.}}$$

Similarly, the share-of-site for a particular advertising network may be determined as:

$$\frac{\text{TOTAL NO. OF PVS FOR DOCS ON SITE WITH WHICH AD NETWORK ASSOCIATED}}{\text{TOTAL NO. OF PVS OF DOCS ON SITE.}}$$

The advertiser's or advertising network's information from client logs 410 may be aggregated across a group of web sites and weighted by the total number of pageviews (PVS) for the documents with which the advertiser's or advertising network's information is associated to determine the share-of-market for the advertiser or advertising network. For example, the share-of-market for a particular advertiser may be determined as:

$$\frac{\text{TOTAL NO. OF PVS FOR DOCS WITH WHICH ADVERTISER ASSOCIATED}}{\text{TOTAL NO. OF PVS OF DOCS ON SITES.}}$$

Similarly, the share-of-market for a particular advertising network may be determined as:

$$\frac{\text{TOTAL NO. OF PVS FOR DOCS WITH WHICH AD NETWORK ASSOCIATED}}{\text{TOTAL NO. OF PVS OF DOCS ON SITES.}}$$

It will be appreciated that the share-of-document, share-of-site, and share-of-market statistics may be determined from client logs 410 captured for a time period (e.g., a day, a week, etc.). In some situations, a web publisher may rotate between multiple advertising networks on a document (e.g., over the course of a day). To account for the randomness of advertisement placements, client logs 410 may be captured at random times (e.g., at different time each day) and the statistics averaged based on the different sets of logs.

In addition, a number of reports may be generated based on the share-of-document, share-of-site, and share-of-market statistics. For example, an advertising network (or advertiser) may generate reports that compare the advertising network's visibility on a web site or group of web sites to the visibility of the advertising network's competitors on that web site or group of web sites. Moreover, by monitoring these statistics over time (e.g., from one week to the next, one month to the next), the advertising network may readily determine when new competitors enter the market, when competitors leave the market, on which web sites their competitors have increased their visibility, on which web sites their competitors have decreased their visibility, etc. These types of reports can give the advertising network (or advertiser) an advantage over their competitors.

EXAMPLES

Figure 7:
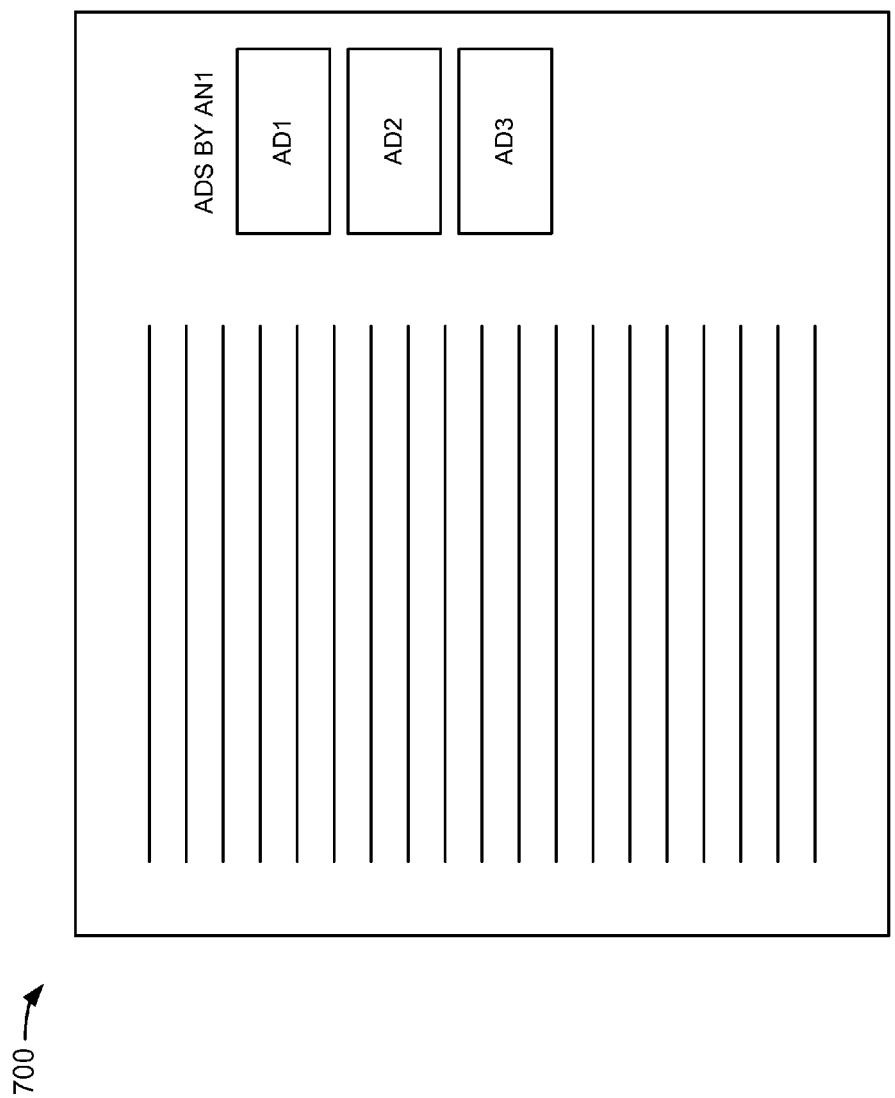

The following examples illustrate the above processing. In the first example, assume, as illustrated in FIG. 7, a document 700 includes a number of advertisements AD1, AD2, and AD3 for different advertisers that are provided by a first advertising network (AN1). The share-of-document may be determined for each of the advertisers by dividing the number of advertisements that the advertiser has on document 700 by the total number of advertisements on document 700. Thus, for example, the share-of-document for advertiser AD1 is 33%.

Figure 8:
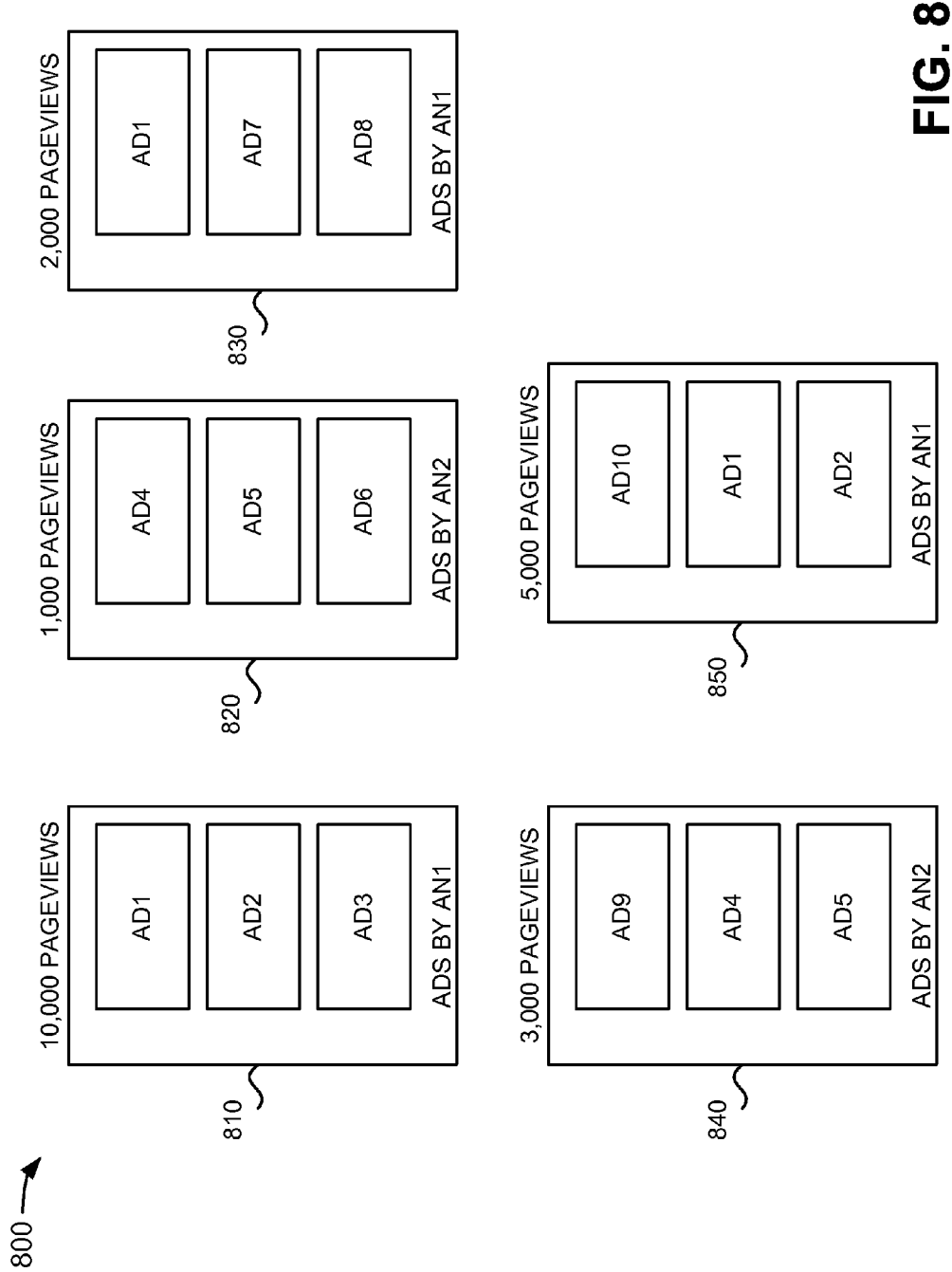

In the second example, assume, as illustrated in FIG. 8, a web site 800 includes five documents 810, 820, 830, 840, and 850. As illustrated, document 810 includes advertisements AD1, AD2, and AD3 that are provided by a first advertising network (AN1). Also, it has been determined (e.g., via client logs 410) that document 810 has been viewed 10,000 times for this particular period of time. Document 820 includes advertisements AD4, AD5, and AD6 that are provided by a second advertising network (AN2). Also, it has been determined (e.g., via client logs 410) that document 820 has been viewed 1,000 times. Document 830 includes advertisements AD1, AD7, and AD8 that are provided by the first advertising network. Also, it has been determined (e.g., via client logs 410) that document 830 has been viewed 2,000 times. Document 840 includes advertisements AD9, AD4, and AD5 that are provided by the second advertising network. Also, it has been determined (e.g., via client logs 410) that document 840 has been viewed 3,000 times. Document 850 includes advertisements AD10, AD1, and AD2 that are provided by the first advertising network. Also, it has been determined (e.g., via client logs 410) that document 850 has been viewed 5,000 times.

Assume, for explanatory purposes, that the share-of-site is to be determined for the first advertising network for web site 800. To determine the first advertising network's share-of-site, the total pageviews for the documents on web site 800 with which the first advertising network is associated may be divided by the total pageviews of the documents on web site 800. Thus, the first advertising network's share-of-site may be determined as 17,000/21,000 or 81%. Similarly, the second advertising network's share-of-site may be determined as 4,000/21,000 or 19%.

Assume, for explanatory purposes, that the share-of-site is to be determined for advertiser AD1 for web site 800. To determine advertiser AD1's share-of-site, the total pageviews for the documents on web site 800 with which advertiser AD1 is associated may be divided by the total pageviews of the documents on web site 800. Thus, the advertiser AD1's share-of-site may be determined as 17,000/21,000 or 81%.

In the third example, assume, as illustrated in FIG. 9, that a group of web sites 900 include web site 910, web site 920, and web site 930. Group of web sites 900 may include all or a portion of the web sites from a particular country, all or a portion of the web sites on the Internet, or some other grouping of web sites. For example, in one implementation consistent with the principles of the invention, group of web sites 900 may include a predetermined number of the most popular web sites in a particular country or on the Internet. For example, group of web sites 900 may include the 5,000 most popular web sites in a particular country or on the Internet. This predetermined number may be considered as representative of all of the web sites from the particular country or all of the web sites on the Internet.

As illustrated, web site 910 includes three documents 912, 914, and 916. Document 912 includes advertisements AD1, AD2, and AD3 that are provided by a first advertising network (AN1). Also, it has been determined (e.g., via client logs 410) that document 912 has been viewed 10,000 times during a particular time period. Document 914 includes advertisements AD4, AD5, and AD6 that are provided by a second advertising network (AN2). Also, it has been determined (e.g., via client logs 410) that document 914 has been viewed 1,000 times. Document 916 includes advertisements AD7, AD8, and AD9 that are provided by the first advertising network. Also, it has been determined (e.g., via client logs 410) that document 916 has been viewed 3,000 times.

Web site 920 includes four documents 922, 924, 926, and 928. Document 922 includes advertisements AD1, AD2, and AD3 that are provided by the first advertising network. Also, it has been determined (e.g., via client logs 410) that document 922 has been viewed 1,000 times. Document 924 includes advertisements AD10, AD11, and AD12 that are provided by the second advertising network. Also, it has been determined (e.g., via client logs 410) that document 924 has been viewed 5,000 times. Document 926 includes advertisements AD13, AD14, and AD15 that are provided by a third advertising network (AN3). Also, it has been determined (e.g., via client logs 410) that document 926 has been viewed 4,000 times. Document 928 includes advertisements AD4, AD5, and AD6 that are provided by the second advertising network. Also, it has been determined (e.g., via client logs 410) that document 928 has been viewed 8,000 times.

Web site 930 includes three documents 932, 934, and 936. Document 932 includes advertisements AD16, AD17, and AD18 that are provided by the third advertising network. Also, it has been determined (e.g., via client logs 410) that document 932 has been viewed 2,000 times. Document 934 includes advertisements AD19, AD20, and AD21 that are provided by a fourth advertising network (AN4). Also, it has been determined (e.g., via client logs 410) that document 934 has been viewed 1,000 times. Document 936 includes advertisements AD4, AD22, and AD23 that are provided by the second advertising network. Also, it has been determined (e.g., via client logs 410) that document 936 has been viewed 1,000 times.

Assume, for explanatory purposes, that the share-of-market is to be determined for the first advertising network for group of web sites 900. To determine the first advertising network's share-of-market, the total pageviews for the documents on web sites 900 with which the first advertising network is associated may be divided by the total pageviews of the documents on web sites 900. Thus, the advertising network's share-of-market may be determined as 14,000/36,000 or 39%.

Assume, for explanatory purposes, that the share-of-market is to be determined for advertiser AD4 for group of web sites 900. To determine advertiser AD4's share-of-market, the total pageviews for the documents on web sites 900 with which the advertiser AD4 is associated may be divided by the total pageviews of the documents on web sites 900. Thus, advertiser AD4's share-of-market may be determined as 10,000/36,000 or 28%.

CONCLUSION

Systems and methods consistent with the principles of the invention provide information to advertisers or advertising networks relating to the visibility of their advertisements on a document or one or a group of web sites.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 5 and 6, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:

determining, by one or more processors of one or more server devices, respective first numbers of times that documents, associated with a web site, are presented to clients during a first time period, at least one of the documents including at least one advertisement;

determining, by one or more processors of one or more server devices and based on the respective first numbers of times, a first share-of-site for at least one of an advertiser or an advertising network associated with the least one advertisement, the first share-of-site being determined based on comparing the respective first numbers of times to a subset of the respective first numbers of times, the subset of the respective first numbers of times corresponding to presenting the at least one of the documents to the clients during the first time period;

determining, by one or more processors of one or more server devices, respective second numbers of times that documents, associated with the web site, are presented to clients during a second time period;

determining, by one or more processors of one or more server devices and based on the respective second numbers of times, a second share-of-site for the at least one of the advertiser or the advertising network, the second share-of-site being determined based on comparing the respective second numbers of times to a subset of the respective second numbers of times, the subset of the respective second numbers of times corresponding to presenting the at least one of the documents to the clients during the second time period; and comparing, by one or more processors of one or more server devices, the first share-of-site and the second share-of-site to identify a change associated with a visibility of the at least one of the at least one of the advertiser or the advertising network between the first time period and the second time period.

2. The method of claim 1, where the group of documents includes web pages from a domain associated with the web site.

3. The method of claim 1, where the group of documents includes a particular number of a most popular set of documents associated with the web site.

4. The method of claim 1, where capturing the client logs further includes:
obtaining document identification information from a toolbar being executed on one or more of the clients.

5. The method of claim 1, where capturing the client logs further includes:
obtaining document identification information from a browser associated with at least one of the clients, and
identifying the group of documents further based on the document identification information.

6. The method of claim 5, where obtaining the document identification information includes:
obtaining the document identification information based on a request, from the browser, for an advertisement.

7. The method of claim 1, where identifying the group of documents includes:
obtaining document identification information from a document the group of documents; and
identifying the group of documents further based on the document identification information.

8. The method of claim 7, where obtaining the document identification information further includes:
obtaining the document identification information as part of a request, from the document, for an advertisement associated with the at least one of an advertiser or an advertising network.

9. The method of claim 1, further comprising:
capturing client logs associated with activity of the clients with respect to the web site,
where the respective first numbers and the respective first numbers are determined based on the client logs.

10. A computer-readable storage device that stores instructions, the instructions comprising:
one or more instructions that, when executed by one or more server devices, cause the one or more server devices to determine respective first numbers of times that first documents, associated with a first web site, are presented to clients, at least one of the first documents including at least one advertisement;
one or more instructions that, when executed by one or more server devices, cause the one or more server devices to determine, based on the respective first numbers, a first share-of-site for an advertiser or an advertising network, associated with the at least one advertisement, on the first web site,
the one or more instructions to determine the first share-of-site including:
one or more instructions to determine the first share-of-site based on comparing the respective first numbers of times to a subset of the respective first numbers of times, the subset of the respective first numbers of times corresponding to presenting the at least one of the first documents to the clients;

one or more instructions that, when executed by one or more server devices, cause the one or more server devices to determine respective second numbers of times that second documents, associated with a second web site, are presented to the clients, at least one of the second documents including the at least one advertisement;
one or more instructions that, when executed by one or more server devices, cause the one or more server devices to determine, based on the respective second numbers, a second share-of-site for the advertiser or the advertising network on the second web site,
the one or more instructions to determine the second share-of-site including:
one or more instructions to determine the second share-of-site based on comparing the respective second numbers of times to a subset of the respective second numbers of times, the subset of the respective second numbers of times corresponding to presenting the at least one of the second documents to the clients; and
one or more instructions that, when executed by one or more server devices, cause the one or more server devices to compare the first share-of-site and the second share-of-site to determine respective visibilities of the advertiser or the advertising network on the first web site and the second web site.

11. The computer-readable storage device of claim 10, where the one or more instructions to capture the client logs further comprise:
one or more instructions to obtain document identification information from a browser executed at least one of the clients,
where the respective first numbers and the respective first numbers are determined further based on the document identification information.

12. The computer-readable storage device of claim 10, where the instructions further comprise:
one or more instructions to capture client logs associated with activity of the clients with respect to the first web site and the second web site,
where the respective first numbers and the respective first numbers are determined based on the client logs.

13. The computer-readable storage device of claim 12, where the one or more instructions to capture the client logs further comprise:
one or more instructions to obtain document identification information from a toolbar executed by a browser associated with at least one of the clients,
where the respective first numbers and the respective first numbers are determined further based on the document identification information.

14. A method comprising:
determining, by one or more processors of one or more server devices, respective numbers of times that documents, associated with a group of the web sites, are presented to clients,
a first group of the documents including at least one first advertisement associated with a first advertiser or a first advertising network, and a second group of the documents including at least one second advertisement associated with a second advertiser or a second advertising network;
determining, by one or more processors of one or more server devices, a first share-of-market for the first advertiser or the first advertising network,
the first share-of-market being determined based on comparing the respective numbers of times to a first subset of the respective numbers of times, the first subset of the respective numbers of times corresponding to presenting the first group of documents to the clients;

determining, by one or more processors of one or more server devices, a second share-of-market for the second advertiser or the second advertising network, the second share-of-market being determined based on comparing the respective numbers of times to a second subset of the respective numbers of times, the second subset of the respective numbers of times corresponding to presenting the second group of documents to the clients; and comparing, by one or more processors of one or more server devices, the first share-of-market and the second share-of-market to compare, with respect to the group of web sites, a first visibility of the first advertiser or the first advertising network to a second visibility of the second advertiser or the second advertising network.

15. The method of claim 14, where the documents includes web pages.

16. The method of claim 14, where the documents includes a particular number of a most popular set of documents from the group of web sites.

17. The method of claim 14, where the group of web sites includes a particular number of web sites from an Internet.

18. The method of claim 14, where the group of web sites includes a particular number of web sites from a selected country or region.

19. The method of claim 14, further comprising:
determining, for at least one document in the documents, first amount of presence of the first advertiser or the first advertising network on the at least one document based on a total number of advertisers on the at least one document; and
determining an amount of presence of the second advertiser or the second advertising network on the at least one document based on the total number of advertisers on the at least one document.

20. The method of claim 14, further comprising:
determining, for a web site of the group of web sites, a share-of-site for the first advertiser or the first advertising network,
the share-of-site being determined based comparing a third subset of the respective numbers of times to a fourth subset of the respective numbers of times,
the third subset of the respective numbers of times corresponding to presenting a subset of the documents that is associated with the web site, and
the fourth subset of the respective numbers of times corresponding to presenting a subset of the first group of documents that is associated with the web site.

21. The method of claim 14, further comprising:
capturing client logs associated with activity of the clients with respect to the web site,
where the respective numbers are determined based on the client logs.

22. The method of claim 21, where capturing the client logs includes:
obtaining document identification information from a toolbar associated with at least one of the clients.

23. The method of claim 21, where capturing the client logs includes:
obtaining document identification information from a browser associated with at least one of the clients.

24. The method of claim 23, where obtaining the document identification information includes:
obtaining the document identification information as part of a request, from the browser, for an advertisement.

25. The method of claim 21, where capturing the client logs includes:
obtaining document identification information from one of the documents.

26. The method of claim 25, where obtaining the document identification information includes:
obtaining the document identification information as part of a request, from the one of the documents, for an advertisement.

27. A device comprising:
a memory to store instructions; and
one or more processors to execute the instructions to:
determine, for a group of documents associated with a web site:
first values representing respective first numbers of times that the group of documents are presented to clients access the during a first time period, at least one document in the group of documents including at least one advertisement, and
second values representing second numbers of times that the group of documents are presented to the clients access during a second time period,
determine, based on the first values, a first share-of-site, during the first time period, for an advertiser or an advertising network associated with the at least one advertisement,
the one or more processors determining the first share-of-site based on comparing the first values to a subset of the first values, the subset of the first values corresponding to presenting the at least one document to the clients during the first time period,
determine, based on the second values, a second share-of-site, during the second time period, for the advertiser or the advertising network,
the one or more processors determining the second share-of-site based on comparing the second values to a subset of the second values, the subset of the second values of times corresponding to presenting the at least one document to the clients during the second time period, and
compare the first share-of-site and the second share-of-site to identify a change associated with a visibility of the at least one of the advertiser or the advertising network between the first time period and the second time period.

28. The device of claim 27, where the one or more processors, when capturing the client logs, are further to:
obtain document identification information from a browser associated with at least one of the clients.

29. The device of claim 28, where the one or more processors, when obtaining the document identification information, are further to:
obtain the document identification information as part of a request, from the browser, for an advertisement.

30. The device of claim 27, where the one or more processors, when determining the first values and the second values, are further to execute the instructions to:
capture, from the clients, client logs associated with activity of the clients with respect to the web site,
determine the first values and the second values based on the client logs.

31. A system comprising:
a memory to store instructions; and
one or more processors to execute the instructions to:

determine, a first group of documents associated with a first web site in a group of web sites, first values representing respective first numbers of times that the first group of documents are presented to clients, at least one of the first group of documents including at least one advertisement, determine, for a second group of documents associated with a second web site in the group of web sites, second values representing respective second numbers of times that the second group of documents are presented to the clients, at least one of the second group of documents including the at least one advertisement, determine, based on the first values, a first share-of-site, on the first web site, for at least one advertiser or at least one advertising network associated with the at least one advertisements, the one or more processors, when determining the first share-of-site, being further to:

determine the first share-of-site based on comparing the first values to a subset of the first values, the subset of the first values corresponding to presenting the at least one of the first group of documents to the clients, determine, based on the second values, a second share-of-site, on the second web site, for at the least one advertiser or at the least one advertising network, the one or more processors, when determining the second share-of-site, being further to:

determine the second share-of-site based on comparing the second values to a subset of the second values, the subset of the first values corresponding to presenting the at least one of the second group of documents to the clients, and compare the first share-of-site and the second share-of-site to compare respective visibilities of the at least one advertiser or the at least one advertising network on the first web site and the second web site.

32. The system of claim 31, where the one or more processors are further to execute the instructions to:

capture, from the clients, client logs associated with activity of the clients with respect to the group of web sites, the one or more processors determining the first values and the second values based on the client logs.

33. The system of claim 32, where the processor, when capturing the client logs, is further to:

obtain document identification information from a browser associated with at least one of the clients.

34. The system of claim 33, where the processor, when obtaining the document identification information, is further to:

obtain the document identification information as part of a request, from the browser, for an advertisement.

35. A computer-readable storage device that stores instructions, the instructions comprising:

one or more instructions that, when executed by the one or more server devices, cause the one or more server devices to determine for a group of documents associated with a group of web sites:

first values representing respective first numbers of times that the group of documents are presented to clients during a first time period, at least one document in the group of documents including at least one advertisement, and second values representing respective second numbers of times that the group of documents are presented to the clients during a second time period;

one or more instructions that, when executed by the one or more server devices, cause the one or more server devices to determine, based on the first values, a first share-of-market for at least one advertiser or at least one advertising network during the first time the one or more instructions to determine the first share-of-market including:

one or more instructions to determine the first share of market based on comparing the first values to a subset of the first values, the subset of the first values corresponding to presenting the at least document, in the group of documents, to the clients during the first time period;

one or more instructions that, when executed by the one or more server devices, cause the one or more server devices to determine, based on the second values, a second share-of-market for the at least one advertiser or the at least one advertising network during the second time period, the one or more instructions to determine the second share-of-market including:

one or more instructions to determine the second share of market based on comparing the second values to a subset of the second values, the subset of the second values corresponding to presenting the at least document, in the group of documents, to the clients during the second time period; and one or more instructions that, when executed by the one or more server devices, cause the one or more server devices to compare the first share-of-market and the second share-of-market to identify a change associated with a visibility of the at least one advertiser or the at least one advertising network between the first time period and the second time period, across the group of websites.

36. The computer-readable storage device medium of claim 35, where the instructions further comprise:

one or more instructions that, when executed by the one or more server devices, cause the one or more server devices to capture, from the clients, client logs associated with activity of the clients with respect to the group of web sites, the first values and the second values being determined based on the client logs.

37. The computer-readable storage device of claim 36, where the one or more instructions to capture the client logs further comprise:

one or more instructions to obtain document identification information from a toolbar associated with at least one of the clients.

38. The non computer-readable storage device of claim 36, where the one or more instructions to capture the client logs s further comprise:

one or more instructions to obtain document identification information from a browser of the one or more browsers.

39. A method comprising:

determining, by one or more processors of one or more server devices, document identification information associated with a plurality of documents containing advertisements, the plurality of documents including:

first documents associated with a first group of web sites, and second documents associated with a second group of web sites;

determining, by one or more processors of one or more server devices and based on the document identification information, first values representing respective first numbers of times that the first documents are presented to clients;

determining, by one or more processors of one or more server devices and based on the document identification information, second values representing respective second numbers of times that the second documents are presented to the clients;

determining, by one or more processors of one or more server devices, first advertising statistics, associated with the first group of web sites, for at least one of an advertiser or an advertising network based on the first respective values;

determining, by one or more processors of one or more server devices, second advertising statistics, associated with the second group of web sites, for the at least one of the advertiser or the advertising network based on the second respective values; and comparing, by one or more processors of one or more server devices, the first advertising statistics and the second advertising statistics to compare respective visibilities of the at least one of the advertiser or the advertising network on the first group of web sites and the second group of web site.

40. The method of claim 39, where the document identification information includes uniform resource locators (URLs).

41. The method of claim 39, where capturing the document identification information includes:
    obtaining at least some of the document identification information from a toolbar associated with one of the clients.

42. The method of claim 39, where capturing the document identification information includes:
    obtaining at least some of the document identification information from a browser associated with one of the clients.

43. The method of claim 39, where capturing the document identification information includes:
    obtaining at least some of the document identification information from a document of the plurality of documents.

44. The method of claim 39, further comprising:
    capturing, from the clients, client logs associated with activity of the clients with respect to the plurality of documents,
    the first values and the second values being determined further based on the client logs.

* * * * *

UNITED STATES PATENT AND TRADEMARK OFFICE
CERTIFICATE OF CORRECTION

PATENT NO. : 8,412,569 B1
APPLICATION NO. : 13/021349
DATED : April 2, 2013
INVENTOR(S) : Scott Benson et al.

It is certified that error appears in the above-identified patent and that said Letters Patent is hereby corrected as shown below:

In the Claims:

Column 11, claim 7, line 32, after "document" insert --of--.

Column 16, claim 35, line 5, after "time" insert --period,--.

Signed and Sealed this
Twenty-eighth Day of May, 2013

Teresa Stanek Rea
*Acting Director of the United States Patent and Trademark Office*